Nov. 7, 1933.  C. T. CARLSON  1,933,890
ENAMELED SHEET METAL COOKING RECEPTACLE
Filed Aug. 6, 1932  2 Sheets-Sheet 1
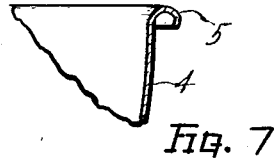
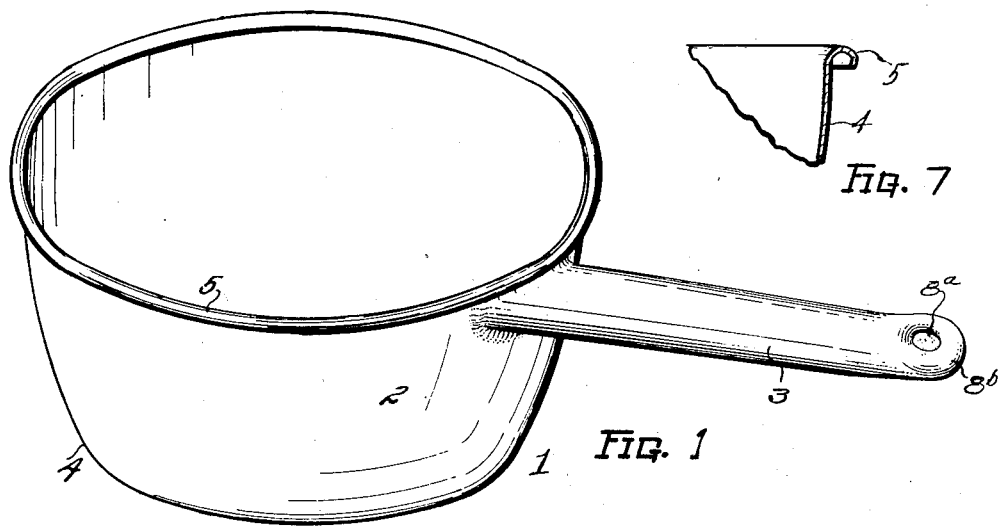
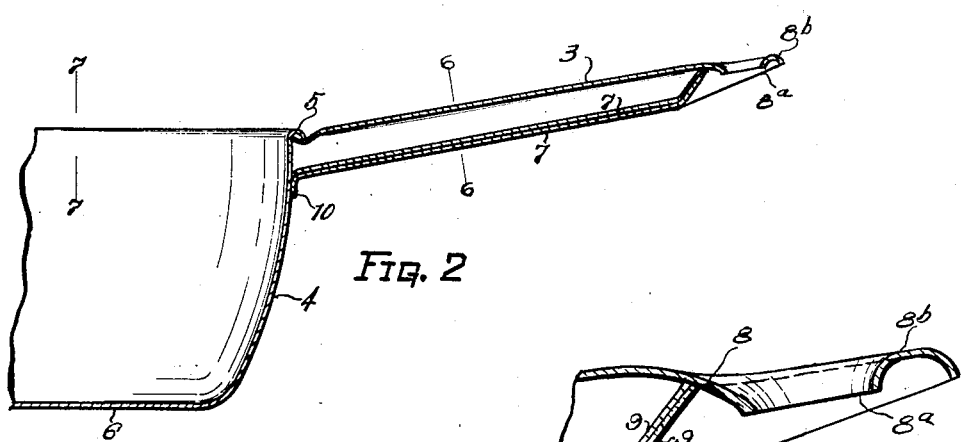
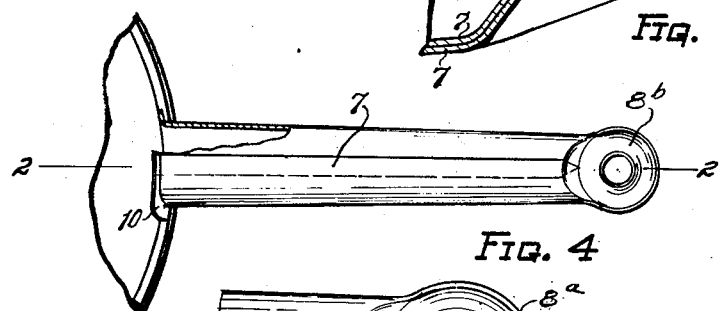
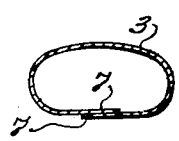
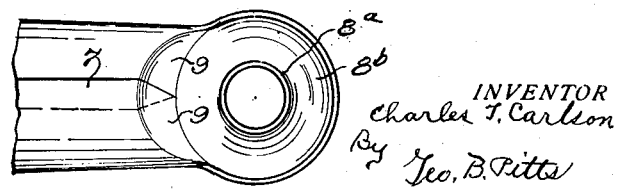

Nov. 7, 1933.     C. T. CARLSON     1,933,890
ENAMELED SHEET METAL COOKING RECEPTACLE
Filed Aug. 6, 1932      2 Sheets-Sheet 2
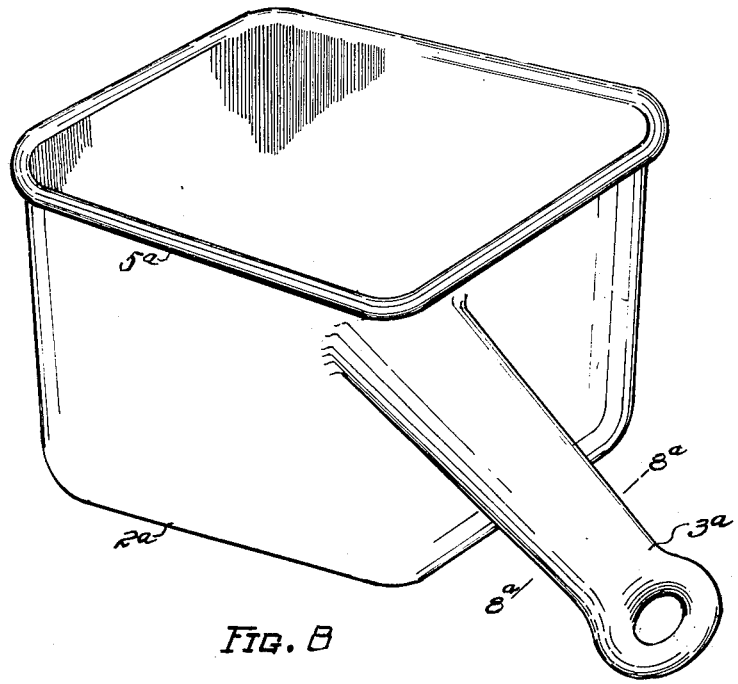
Fig. 8
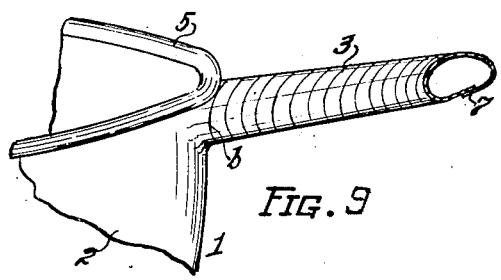
Fig. 9
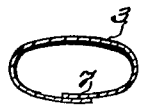
Fig. 8ª
INVENTOR
Charles T. Carlson
BY
ATTORNEY Patented Nov. 7, 1933

1,933,890

UNITED STATES PATENT OFFICE 1,933,890

ENAMELED SHEET METAL COOKING RECEPTACLE

Charles T. Carlson, Canton, Ohio, assignor to The Republic Stamping and Enameling Company, Canton, Ohio, a corporation of Ohio Application August 6, 1932. Serial No. 627,711

3 Claims. (Cl. 53—8)

This invention relates to enameled bodies formed of sheet metal and provided with handles, more particularly receptacles which may or may not be provided with covers. In practice I have applied my invention to receptacles generally known as kitchen ware, that is, receptacles for holding liquids and edibles, but it is not intended that the invention is to be limited to receptacles used for this purpose.

One object of the invention is to provide an improved receptacle having a hollow handle so constructed and connected to the body of the receptacle that a minimum labor is required in preparing the handle surfaces for coating thereof and a minimum amount of enamel is required to coat it ready for burning, thereby preventing waste of such material.

Another object of the invention is to provide an improved receptacle having a hollow handle connected in sealed relation at its inner end to the body of the receptacle and closed at its outer end in a substantially liquid tight manner so that in beading the handle or dipping it into liquid enamel for coating it, the liquid enamel is prevented from flowing into the interior of the handle.

Other objects of the invention will be apparent to those skilled in the art to which my invention relates from the following description taken in connection with the accompanying drawings, wherein Fig. 1 is a perspective view of a receptacle embodying my invention.

Fig. 2 is a fragmentary section on the line 2—2 of Fig. 4.

Fig. 3 is a fragmentary section of the outer end of the handle on the line 2—2 of Fig. 4, enlarged.

Fig. 4 is a bottom plan view of the handle and adjacent portions of the receptacle body.

Fig. 5 is a fragmentary view of the outer end portion of the handle enlarged.

Figs. 6 and 7 are sections, on the lines 6—6 and 7—7, respectively, of Fig. 2.

Fig. 8 is a perspective view showing a different embodiment of the invention.

Fig. 8a is a section on the line 8a—8a of Fig. 8.

Fig. 9 is a perspective view of a portion of a receptacle showing one color arrangement for the handle and body.

In enameling and finishing receptacles of this type, it is customary to enamel the interior and exterior walls of their bodies one color and to enamel their handles and the rim of the bodies a different color.

In all enameled receptacles, of which I am aware, the construction of the handles therefor has been such that undue waste of the enamel resulted and/or in carrying out the above color arrangement a large amount of labor was required for cleaning off the enamel adhering to portions of the handle adjacent the body, when each coat was applied to the latter, so that the coat of enamel for the handle could be applied thereto with the two colors terminating at the desired point, usually at the joint between the handle and body, to produce an attractive and ornamental finished appearance. For example, in applying a coat to the body portion the latter is submerged in the enamel bath so that the enamel extends up the handle and adheres to the outer and inner portions thereof, requiring considerable labor and care in properly removing it. Thus it will be seen that if this enamel is left on the handle and burned, that portion of the handle, after the handle is enameled with its coat and burned, will have a greater number of thicknesses of enamel as compared to the remaining portion of the handle; the effect of which is to produce ridges, bulged portions and an unevenness along the handle and a product of unattractive appearance. To eliminate these defects, it is necessary to clean off this excess enamel. Where the handle wall is curled along its longitudinal sides to form beads, such operations require an undue amount of manual labor, which increases the cost of the receptacles. In another form of handle, the latter has been provided with openings, which permitted the enamel to flow into the interior of the handle, each time the handle was dipped in the enamel bath or beaded for coating. This form of construction has disadvantages as time was lost in waiting for drainage to take place, special equipment was required to hold the bodies to permit drainage and the enamel which ahered to the interior walls of the handle was wasted.

As will be understood from the following description, my improved construction eliminates the above difficulties and disadvantages. Referring to Figs. 1 to 7, inclusive, 1 indicates as an entirety a receptacle comprising a body 2 and a handle 3. In the form now being referred to, the body 2 is circular and shaped to form a side wall 4, having a terminating rim or bead 5 and a bottom 6. The body 2 may be formed or shaped in any desired manner. The handle 3 preferably extends radially in a rectilinear direction and is formed from a section of sheet metal of suitable gage to insure lightness while retaining sufficient strength for lifting the receptacle when in use and otherwise. The section of sheet metal for the handle is bent in any approved manner into tubular form preferably of the shape in cross section shown in Fig. 6. The longitudinal marginal portions of the metal section overlap each other as shown 7, 7, which portions are welded together from end to end or at spaced points, to produce a substantially liquid tight joint. The outer end of the tubular body is closed to prevent inflow of enamel. By preference, the metal section forming the handle is shaped so that when it is bent into tubular form, (a) the upper wall extends beyond the lower wall, as shown at 8 and such extension is stamped to form in it an opening 8a and a surrounding embossed wall 8b and (b) the end portions of the lower wall are bent inwardly, as shown at 9, into engagement with the inner surface of the upper wall 8, to which the end portions 9, 9, are secured by welding or other means in a substantially liquid tight manner, such end portions thereby forming an outer end wall for the handle. As shown in Figs. 2, 3, 4 and 5, the end portions 9 close the handle 3 at its outer end inwardly of the extension 8, so that the latter constitutes a single wall which may be conveniently engaged with and disengaged from a nail, hook or the like device. The inner end of the handle 3 is provided with a peripheral flange 10, which is welded to the side wall 4 of the body, whereby the body and handle are rigidly secured together and the latter closed at its inner end by the wall 4 against inflow of liquid enamel.

In the construction of handle described, the handle is shaped to provide exterior surfaces all portions of which from end to end of the handle are smooth and readily accessible, so that any enamel adhering thereto as a result of dipping the body portion in a bath, may be readily removed, thereby conditioning the surfaces of the handle for its coat of enamel, as shown at B, such coat and the coat of enamel on the body 2 terminating on the line b. The handle 3 being closed at its inner and outer ends, waste of the liquid enamel is avoided, since it cannot flow into the handle and coat the inner surfaces thereof; that is, even that amount of enamel which would be used in coating the inner surface of the handle is saved. As it is customary to apply two or more coats of enamel on products of the character herein disclosed, it will be seen that a material saving in the quantity of enamel required for a predetermined number of receptacles, results.

In Fig. 8 I have shown a different embodiment in which the body 2a of the receptacle is of polygonal shape and the handle 3a is constructed similar to the handle shown in Figs. 1 to 6, inclusive.

In this form of construction the handle preferably extends, in a plane disposed diagonally of the body 2a, and is joined, by welding, at its inner end to the walls forming one corner of the body, below the rim 5a, in a substantially liquid tight manner.

To those skilled in the art to which may invention relates, many changes in construction and widely differing embodiments and applications of the invention will suggest themselves without departing from the spirit and scope thereof. My disclosures and the description herein are purely illustrative and are not intended to be in any sense limiting.

What I claim is:

1. A receptacle comprising a body of substantially polygonal shape and a hollow handle secured at its inner end to the adjacent side walls of said body at one corner thereof and extending outwardly in a line disposed diagonally of said body, said handle being formed from a section of sheet metal shaped into tubular form and having its longitudinal edges secured together in a liquid tight manner and the inner end of the form being provided with a peripheral flange having angularly related portions secured in a liquid tight manner to two contiguous sides of said body, whereby the latter closes the inner end of the form to prevent inflow of liquid enamel, and the outer ends of said form along the marginal portions of its longitudinal edges being cut away to provide an extension beyond said cut aways and the ends of said cut aways being bent laterally into engagement with the opposite wall of said form to close the outer end thereof to prevent the in-flow of enamel.

2. In a cooking utensil or the like adapted to be enameled, the combination with a receptacle, of a handle therefor formed of a section of sheet metal and shaped from end to end into substantially tubular form with its longitudinal edges secured together in a liquid tight manner, the inner end of said shaped form being provided with a laterally extending peripheral flange secured in a liquid tight manner to the side of said receptacle, whereby the latter closes the inner end of said form to prevent inflow of liquid enamel, the lower wall of said shaped form adjacent its outer end being cut away to form an extended end on the upper wall thereof, the terminating end of the cut-away wall being bent laterally into engagement with the upper wall inwardly of said extended end and secured thereto in a liquid tight manner to close the outer end of said shaped form to thereby prevent the in-flow of liquid enamel, said extended end being formed with an opening.

3. In a cooking utensil or the like adapted to be enameled, the combination with a receptacle, of a handle therefor formed of a section of sheet metal and shaped from end to end into substantially tubular form with its longitudinal edges secured together in a liquid tight manner, the inner end of said shaped form being provided with a laterally extending peripheral flange secured in a liquid tight manner to the side of said receptacle, whereby the latter closes the inner end of said form to prevent inflow of liquid enamel, the lower wall of said shaped form adjacent its outer end being cut away to form an extended end on the upper wall thereof, the terminating end of the cut-away wall being bent laterally into engagement with the upper wall inwardly of said extended end and secured thereto in a liquid tight manner to close the outer end of said shaped form to thereby prevent the in-flow of liquid enamel, said extended end being shaped to engage a supporting device.

CHARLES T. CARLSON.